Patented July 11, 1939

2,165,291

UNITED STATES PATENT OFFICE 2,165,291

METHOD OF MAKING PYROXYLIN COATED MATERIALS

Rowland B. Mitchell, Athol, Mass., assignor to Athol Manufacturing Company, Athol, Mass., a corporation of Massachusetts No Drawing. Original application April 28, 1938, Serial No. 204,837. Divided and this application January 19, 1939, Serial No. 251,739

1 Claim. (Cl. 91—68)

This application is a division of application Serial Number 204,837, filed April 28, 1938, now Patent No. 2,148,405, issued Feb. 21, 1939, which latter is a continuation-in-part of application Serial Number 40,628, filed September 14, 1935.

My invention relates to articles coated with pyroxylin and the like, and is particularly concerned with pyroxylin or like lacquered surfaces which, although having the appearance of surfaces lacquered with normal pyroxylin, possess such properties as permit ink and water sensitive adhesives satisfactorily to be applied thereto.

It will be understood by those skilled in the art that water sensitive glues and pastes, such as water solutions of animal or vegetable glue, gelatine, corn-starch, wheat flour and the like, and water solutions of resins and gums such as borax and ammoniacal solutions of shellac, will not readily adhere to surfaces coated with normal pyroxylin or cellulose acetate lacquers and the like. It will be understood further that, when it is attempted to apply ink to such surfaces, particularly linseed oil base and other oxidizing or polymerizing types of printing ink, water inks and the like, not having a base that will readily dissolve nitrocellulose, the ink will not adhere and flow evenly but will "ball", that is to say, separate irregularly into droplets, and, when dry, will flake off, this effect being aggravated when the pyroxylin contains as a plasticizer a non-drying oil such as castor oil, dibutyl-phthalate, tricresyl-phosphate and the like.

Applicant has found that, by treating the usual normal dry pyroxylin surface to wet it with a suitable mixture of nitrocellulose solvent and non-solvent, the pyroxylin is given the property upon drying of presenting a surface to which water sensitive adhesives and inks will adhere when dry, the ink when applied to such surfaces spreading evenly with entire absence of "balling", so as to secure proper coverage, and that this may be done without altering the appearance of the normal surface. Applicant has found further that the improved surface may also be formed by mixing with nitrocellulose or the like suitable proportions of solvent and non-solvent of nitrocellulose, and applying the mixture to the article to be lacquered, the dry lacquer surface having exactly the same appearance as it would have were no non-solvent employed or an amount thereof insufficient to give the improved surface. Whether or not the mixture of solvent and non-solvent contains nitrocellulose substantially identical improved surfaces are produced.

It is believed that the reason these water sensitive adhesives and inks, when dry, do not adhere to normal pyroxylin surfaces is because of the water and ink non-solubility and lack of porosity of such surfaces, and that inks "ball" when applied thereto because the inks do not "wet" such surfaces, and that they adhere to, and wet inks do not "ball" on, the improved surface, despite it containing no water or ink soluble substance, because it is minutely porous and thus absorbent in respect to the wet inks and adhesives. Applicant has found, for example, that if a miscible non-solvent for nitrocellulose is mixed into the usual normal pyroxylin solution, and the non-solvent is in such small amount that, when the mixture is applied as a coating, all the non-solvent will have substantially evaporated by the time the coating dries sufficiently to become just non-plastic, as indicated by feeling it with the finger, the surface of the coating after it is completely dry will not have the properties mentioned in respect to inks and water sensitive adhesives. On the other hand, he has found that if a large amount of the miscible non-solvent is added to this mixture, so that apparently when the coating dries sufficiently to become just non-plastic it contains a large amount of the non-solvent and substantially no solvent, the coating after being completely dried will have an undesirable clouded greyish-white appearance which is usually irregularly distributed over the surface, that is to say, an appearance something like that which would exist were ordinary dry normal pyroxylin lacquer smeared with a thin water solution of corn-starch and allowed to dry. For convenience of terminology herein and in the appended claims, a surface having this undesirable appearance is referred to as "blushed", and one not having it as "unblushed". However, applicant has found that, if the proportion of non-solvent is somewhat less than that which will cause the formation of the blushed appearance, the finally dried coating will have the desired improved properties in respect to inks and water sensitive adhesives, the coating at the same time having the characteristic unblushed lustrous appearance of the pyroxylin surface which would be formed were no non-solvent employed, or only a small amount thereof insufficient to cause the surface to have the improved properties.

It is believed that when the pyroxylin lacquer coating, which gives these desired results, dries sufficiently to become just non-plastic the solvent has substantially all evaporated, and that the coating is then partially swollen on account of the absorbed non-solvent still present, without there being sufficient non-solvent present to cause at any time a precipitation of nitrocellulose in granular or flocculent form to cause a blushed appearance after the coating entirely dries, and that in this non-plastic state the coating film is in the nature of a sponge which contains the non-solvent, the latter upon evaporating leaving the surface in a porous condition receptive to the inks and water sensitive adhesives, the pyroxylin in the finally dried coating being in an amorphous condition in the same sense that normal dry pyroxylin lacquer is amorphous.

These same effects occur when a solvent and non-solvent mixture is applied to a normal dry pyroxylin lacquer surface, for in that case nitrocellulose at the surface of the lacquer goes into solution with or absorbs the mixture and then dries, and if too little non-solvent is present no appreciable change in the surface will result, whereas if too much non-solvent is present the surface will be given the blushed appearance, whereas if an amount of non-solvent somewhat less than that which will cause the blush is present the surface will be rendered receptive to water sensitive adhesives and inks in the respects mentioned.

However, this porosity which is believed to exist at the surface of the improved coating is not visible to the naked eye, nor has it been directly detected by microscopic or other examination, but the fact that water sensitive glues and pastes, when dried after application, will adhere to the water and ink non-soluble improved surface, and inks will spread evenly thereon without balling, and will not flake off when dry, and the fact these adhesives and inks dry more quickly on the improved surface than on a normal lacquer surface, indicate that the condition of the improved surface is such that it may, for convenience of terminology, be described as "minutely porous", by which words, or words of like import, in the appended claim is meant that the condition of the surface is such that it has the property of causing nitrocellulose non-soluble inks, and water sensitive glues and pastes of the character mentioned, to adhere to it, after drying when applied wet, without material "balling" of the ink when wet.

It will be understood that textiles or leather coated with pyroxylin having the above described improved properties are particularly useful for bookbinding purposes. Such material may readily be pasted to the body of the cover of the books, labels may readily be pasted on the material, and the material may satisfactorily be printed in ink with an appropriate text or design.

As an example of a suitable waterproof pyroxylin compound for coating leather, or coating or impregnating textile and similar material, but without limitation thereto, the same may consist of nitrated cotton, nitrated wood fiber, or other nitrocellulose material dissolved in ethyl, butyl or amyl acetate, acetone, ethyl alcohol-acetone mixture, ethyl or methyl ketones, or like solvents of nitrocellulose. From 2 to 40 ounces of the nitrated cellulose may be used per gallon of the solvent depending upon the heaviness of the solution desired and the degree of solubility of the particular nitrocellulose employed in the particular solvent selected, for example, 24 ounces nitrocellulose of 12 seconds' viscosity as the maximum that may be employed under usual conditions in an ethyl alcohol-acetone mixture. As understood by those skilled in the art, to control the rate of drying of the solvent there may be incorporated small amounts of other substances such as butyl alcohol, benzol, toluol, petroleum naphtha or gasoline, etc. Mixed with this solution, if desired, may be suitable pigment such as drop black, zinc oxide, soluble dyes, and the like commonly employed in the art, and also, if desired, suitable filler, the amount of solid pigment and filler ranging from 1 to 80 ounces per gallon of nitrocellulose solution, the amount roughly increasing with the amount of nitrocellulose in solution. Also a suitable plasticizer, for example, up to 50 ounces of castor oil per gallon of nitrocellulose solution may be employed, the amount increasing with the amount of nitrocellulose in solution and the degree of flexibility desired. Other plasticizers, such as diamyl-phthalate, dibutyl-phthalate, diethyl-phthalate, tricresyl phosphate, methyl phthalyl ethyl glycollate, soya bean or other processed, polymerized or blown oils of a non-drying or semi-drying nature such as corn, cotton-seed, peanut, etc., oxidized or polymerized oils of the drying type such as linseed, China-wood, etc., may be employed. This compound may be spread on the textile or other backing by use of spreader machines commonly employed in the art, and may then be passed through a heated chamber, such as is commonly employed in the art, to dry it, the solvents and driers being driven off by this drying process. The resulting plasticized pyroxylin lacquer coating, which may be in the order of 0.001 inch in thickness, will be the ordinary pyroxylin coating known to the art, and as such the dried plasticized nitrocellulose will be in an amorphous state and the coating will be impervious and waterproof. Such a coating is free from the blushed appearance hereinbefore mentioned, the exposed surface presenting a lustrous polished appearance, the degree of luster varying of course with the amount and kind of pigment and filler employed. These coatings however will not have the properties of the improved coating in respect to water sensitive adhesives and inks. Such coatings, and others made from pyroxylin solutions not having these improved properties, are herein for convenience termed "normal" pyroxylin coatings.

The dried normal lacquer coatings above described may, according to the present invention, as has hereinbefore been pointed out, be treated to make them receptive to water sensitive adhesives and inks in the respects above mentioned without in any substantial respect altering their appearance.

According to the invention, in order to retain the waterproofing effect of the normal pyroxylin coating, the mixture of nitrocellulose solvent and non-solvent may be applied to the dry normal coating, or on that coating may first be spread a second coating of normal pyroxylin solution which may be dried by passing it through a heated chamber to drive off the solvent, and after it is dried the mixture of nitrocellulose solvent and non-solvent may be applied to it. Further, according to the invention, there may be applied to the dry normal base coating a nitrocellulose solution containing the non-solvent. By suitably proportioning the amount of non-solvent to the solvent, and to the amount of nitrocellulose solution if the second coating contains nitrocellulose and non-solvent, the surface of the material after being dried will be receptive to water sensitive adhesives and inks in the respects mentioned.

The mixture of solvent and non-solvent according to the invention may be applied by means of the ordinary spreader machine having a doctor knife for performing the spreading operation, so as to spread a film thereof of minute thickness over the surface of the normal coating just sufficient to wet it. This mixture, constituting in its entirety a pyroxylin solvent, will dissolve into or be absorbed by the exposed surface of the normal coating and then will evaporate when the material is again passed through the heated drier, and will cause a surface film of what is otherwise the normal coating to be rendered receptive to inks and water sensitive adhesives. The same action apparently takes place in this film, when the solvent-non-solvent mixture is dissolved into it and then evaporated, as that hereinbefore described is connection with nitrocellulose solutions, according to the invention, containing both the solvent and non-solvent. The portion of the coating beneath the modified film constituting the surface portion thereof remains in its original impervious waterproof state, not being affected by the mixture of solvent and non-solvent.

When a coating of normal pyroxylin is applied to the normal base coating, and the second coating is treated by the mixture of solvent and non-solvent, the second coating preferably is clear pyroxylin lacquer applied in the form of a film of minute thickness. This film may contain a plasticizer, if desired, but on on account of its extreme thinness ordinarily will need no plasticizer as it will take up plasticizer from the base coating, and in fact will integrally unite with the base coating so as in substance to become part of it.

When the coating applied to the normal base coating is a pyroxylin solution containing nitrocellulose non-solvent in accordance with the invention, it may be a clear pyroxylin solution containing plasticizer, if desired. When spread in the form of a minute film on the base coating and dried it will be receptive to inks and water sensitive adhesives in the respects hereinbefore mentioned, and will in no material respect detract from the appearance of the base coating. By use of clear pyroxylin lacquer in this instance the luster of the base pyroxylin lacquer surface may be increased when such base lacquer contains pigment and filler, as is also the case when a clear pyroxylin lacquer is applied and, after being dried, is treated with a mixture of pyroxylin solvent and non-solvent.

If desired, the second coating of pyroxylin lacquer applied may have exactly the same composition as the lacquer compound applied to form the base coating with the addition of sufficient nitrocellulose non-solvent to secure a pyroxylin lacquer surface that will be receptive to inks and water sensitive adhesives in the respects mentioned. In such case the nitrocellulose, solvent, and non-solvent employed, and the proportions thereof, may be those for the ternary mixtures of nitrocellulose, solvent, and non-solvent hereinafter described.

The mixture according to the invention for treating the base coating, whether or not that coating contains nitrocellulose, in general may be compounded to employ any nitrocellulose solvent as, for example, but without limitation thereto, ethyl, butyl or amyl acetate, acetone, ethyl alcohol-acetone mixture, ethyl or methyl ketones, and like solvents, or, if desired, combinations of any two or more solvents. On the other hand, any pyroxylin non-solvent which will not evaporate too rapidly as compared to the solvent, and which is miscible with the solvent, or, where a pyroxylin solution or compound is employed, is miscible with the pyroxylin solution or compound and will not be absorbed by the pyroxylin too readily as compared to the solvent, in general may be employed as, for example, but without limitation thereto, such substances as ethyl alcohol, water, propyl, butyl or amyl alcohol, petroleum distillates such as naphtha or gasoline, benzol, toluol, xylol, chlorinated solvents such as ethylene-di-chloride, carbon tetrachloride, and the like, and even semi-nitrocellulose solvents such as methyl alcohol and the like.

It is also possible to use combinations of non-solvents, for example: benzol and methyl alcohol; benzol and butyl alcohol; benzol, methyl alcohol and butyl alcohol; toluol and butyl alcohol; toluol, methyl alcohol and butyl alcohol; etc., and in fact most any combination which is miscible with the rest of the mixture.

In general, when no nitrocellulose is present, the greater the miscibility (solubility) of the solvent in the non-solvent the better will be the results secured, and, when nitrocellulose is present, ordinarily the greater the miscibility of the non-solvent in the nitrocellulose solution the better the results will be. Ordinarily, but not necessarily, best results will be secured when the solvent evaporates more rapidly than the non-solvent whether or not nitrocellulose is present. When nitrocellulose is employed, however, the rate of evaporation of the solvent relative to the rate of evaporation of the non-solvent ordinarily is decreased, but the nitrocellulose usually has less effect in this respect if the solvent and non-solvent per se are miscible.

The proportions of solvent and non-solvent that may be employed vary with their miscibility, their relative rate of evaporation, the degree of solubility of nitrocellulose in the solvent, and, where a semi-non-solvent is employed, the relative degree of solubility of nitrocellulose in the solvent and semi-non-solvent. Further, as the degree of solubility of nitrocellulose in the solvent varies with the viscosity of any nitrocellulose that may be present in the treating mixture, these proportions will vary with the kind or viscosity of nitrocellulose present. Further where the normal base coating is treated with a mixture or compound containing nitrocellulose, the proportions of solvent and non-solvent will vary not only in accordance with all the factors just mentioned but with the miscibility of the non-solvent or semi-non-solvent in the nitrocellulose solution, which miscibility, it has been found, is different from that of the non-solvent or semi-non-solvent in the solvent.

Again, the amount of nitrocellulose that may be employed varies not only with the viscosity of the nitrocellulose, and with all these other factors just mentioned, but with the readiness during the drying operation with which it tends to absorb or prevent evaporation of the solvent as compared to the non-solvent. If under these conditions it absorbs the solvent much more readily than it does the non-solvent, the evaporation rate of the solvent from the coating is diminished as compared to that of the non-solvent. Therefore, irrespective of their relative normal evaporation rates, the amount of non-solvent compared to the amount of solvent must be increased to give satisfactory results where the nitrocellulose much more readily absorbs the solvent than the non-solvent, or where an increase in the amount of nitrocellulose content is desired, and under such conditions, for a given mixture of solvent and nonsolvent, less nitrocellulose must be employed. Thus, as apparently substantially all the solvent should be evaporated while the plastic pyroxylin coating still contains non-solvent during the drying of the coating, the proportions of nitrocellulose, solvent, and non-solvent will vary, depending upon the particular ones selected, among other reasons, by reason of the different preferential absorption effect of nitrocellulose for different solvents and non-solvents, this effect also varying with each kind of nitrocellulose employed.

From the above it will be apparent that the ranges of proportions that may be employed of solvent and non-solvent or semi-non-solvent, and of nitrocellulose when present, vary in each instance in complicated fashion with numerous factors depending upon the particular solvent and non-solvent or semi-non-solvent employed and kind of nitrocellulose that may be present.

For example in a binary mixture containing no nitrocellulose, when acetone is the solvent and petroleum distillate of a boiling point from 65 to 100° C. (gasoline) is the non-solvent, about 11 to 26% acetone, with the balance petroleum distillate, may be employed. If ethyl acetate is substituted for the acetone as the solvent, the much larger amount of 25 to 64% solvent may be employed. On the other hand, if butyl alcohol is substituted for the petroleum distillate as the non-solvent when acetone is the solvent, the wide range of 9 to 73% solvent may be employed, and if butyl alcohol is substituted for petroleum distillate when ethyl acetate is the solvent the again wide range of 11 to 73% solvent may be employed. Still further, if acetone is the solvent, and benzol is the non-solvent, about 10 to 52% solvent may be employed, but if ethyl acetate is substituted for the acetone as the solvent the wide range of 20 to 86% solvent may be employed, and, if 95% ethyl alcohol is substituted for the benzol as the non-solvent in these two examples, 7 to 51% acetone may be employed in one case, which is not a great change, and 7 to 41% ethyl acetate in the other case, which is a great change. When toluol is the non-solvent, 11 to 51% acetone, as compared to 13 to 80% ethyl acetate, may be employed for the solvent. In the same way, 7 to 33% acetone may be employed when carbon tetrachloride is the non-solvent, and 7 to 21% acetone when methyl alcohol is the non-solvent, but when ethyl acetate is employed as the solvent with the non-solvent carbon tetrachloride as much as 20 to 80% solvent may be employed, and when with the semi-non-solvent methyl alcohol 6 to 41% solvent may be employed. It will thus be seen that for a given solvent the amount thereof must be decreased or increased depending upon the particular non-solvent employed, and vice versa.

In the specific examples just given all the non-solvents or semi-non-solvents mentioned are miscible (soluble), throughout the ranges thereof mentioned, in the solvents employed, but it will be noted that in each case the proportion of solvent to non-solvent varies.

The interaction of various factors, as affecting these proportions, may be understood from considering some of them in the case of the solvents acetone and ethyl acetate, for example. Acetone evaporates more rapidly than any of the non-solvents or semi-non-solvents mentioned except the petroleum distillate, and ethyl acetate evaporates more rapidly than any of the non-solvents mentioned except the petroleum distillate, benzol and carbon tetrachloride. It will be observed, however, that as the relative miscibility of the solvent and non-solvent varies in these instances of combinations of solvent and non-solvent, and likewise, among other determining factors, the degree of solubility of nitrocellulose in the solvent, the relative rate of evaporation in itself does not indicate the percentages of solvent and non-solvent that may be employed.

The proportions of solvent and non-solvent, above given, for mixtures which contain no nitrocellulose are those which will work satisfactorily for treating pyroxylin coatings containing the kinds of nitrocellulose commonly employed in the art, say those of 5 to 40 seconds' viscosity, and, less commonly, up to 50 seconds' and down to ¼ second's viscosity, but usually about 10 to 12 seconds' viscosity, and, in this respect, the degree of viscosity of the particular nitrocellulose in the coating does not materially affect those proportions.

However, when the mixture with which the normal base lacquer is treated contains nitrocellulose the proportion of solvent and non-solvent in the binary mixture to which the nitrocellulose is added again varies. For example, if an appreciable amount of nitrocellulose is added to the 11 to 26% acetone-balance petroleum distillate binary mixture mentioned above, it will absorb or dissolve all the acetone and the petroleum distillate will separate out, making the mixture unusable. However, by substantially increasing the amount of acetone, a maximum of about 15% nitrocellulose of 12 seconds' viscosity can be added to the binary mixture of solvent and non-solvent, and a proportionately greater or smaller amount when a nitrocellulose of less or greater viscosity, respectively, is added, say 8% for nitrocellulose of 40 seconds' viscosity, 10% for that of 25 seconds' viscosity, 20% for that of 5 seconds', and 25% for that of ¼ second's, the viscosity varying with the nitrocotton or other nitrocellulose employed for making the solution. The percentage proportion of solvent and non-solvent in the binary mixture to which nitrocellulose is added however will vary with each percentage of nitrocellulose of given viscosity employed. For example, when 15% nitrocellulose of 12 seconds' viscosity is employed, the binary mixture of solvent and non-solvent must be about 79 to 80% acetone, balance petroleum distillate, and, when 10% of this nitrocellulose is employed, 78 to 82% acetone, balance petroleum distillate, while when 5% of this nitrocellulose is employed the range of acetone is 61 to 72%, balance petroleum distillate.

Further, if ethyl acetate is substituted as the solvent for acetone in the acetone-petroleum distillate binary mixture, the same maximum amounts of nitrocellulose of corresponding viscosities may be added, but the ranges of solvent and non-solvent will be entirely different, and different from the 25 to 64% ethyl acetate which may be employed when no nitrocellulose is added to the ethyl acetate-petroleum distillate mixture. For example, when 15% nitrocellulose of 12 seconds' viscosity is added to the binary ethyl acetate-petroleum distillate mixture the much lower range (as compared to when acetone is employed) of 58 to 62% solvent must be employed in that binary mixture, while when 10% of this nitrocellulose is added 55 to 58% solvent must be employed in the binary mixture.

Still further, when butyl alcohol is substituted for petroleum distillate in the acetone-petroleum distillate mixture the maximum amounts of nitrocellulose that may be added are increased, these amounts being, approximately, 12% for nitrocellulose of 40 seconds' viscosity, 18% for that of 25 seconds' viscosity, 25% for that of 12 seconds', 30% for that of 5 seconds', and 40% for that of ¼ second's. However, the proportions of solvent and non-solvent must again be varied, for example, with the maximum amount of nitrocellulose of 12 seconds' viscosity, instead of being able to employ 9 to 73% acetone as when no nitrocellulose is added to the acetone-butyl alcohol mixture, and 79 to 80% acetone when the maximum amount of this nitrocellulose is added to the acetone-petroleum distillate mixture, only about 28 to 60% acetone may be employed.

Again, if ethyl acetate is substituted for acetone in the acetone-butyl alcohol mixture, the maximum amount of nitrocellulose of 12 seconds' viscosity is only slightly decreased to about 22%, with proportionately corresponding decreases in the amounts of nitrocellulose of other viscosities. However, as a result of this substitution there must be a much greater proportionate decrease in the amount of ethyl acetate employed. For example, this amount (which is 11 to 73% when no nitrocellulose is added) must for the maximum of nitrocellulose of 12 seconds' viscosity, be changed from 28 to 60% to 20 to 45%, and to proportionately different amounts for other amounts of nitrocellulose.

On the other hand, if 95% ethyl alcohol is substituted for the butyl alcohol in the ethyl acetate-butyl alcohol mixture the maximum amounts of nitrocellulose that may be employed are further decreased, as, for example, to 20% for nitrocellulose of 12 seconds' viscosity, with corresponding decreases in the amounts of nitrocellulose of other viscosities. In this case, instead of 7 to 41% ethyl acetate being employed when no nitrocellulose is added to the ethyl acetate-95% ethyl alcohol mixture, about 21 to 24% must be present in the binary mixture when 20% nitrocellulose of 12 seconds' viscosity is added thereto, and about 9 to 22% when 10% of this nitrocellulose is added, and again it will be noted that, although the change in the permissible amounts of nitrocellulose as affected by the substitution is not great, the necessary change in the amount of solvent is markedly great.

The effect on the proportions of constituents, as influenced on one hand by the solubility of nitrocellulose in the solvent, and, on the other hand, by the miscibility of the non-solvent in the nitrocellulose solution, is apparent from a comparison of some of the above specific examples of ternary combinations including nitrocellulose, which comparison shows that what may be the determining factor in respect to these proportions in one case exercises little or no influence in another case wherein something else may be the determining factor, from which it follows that no general rule can be laid down as to the factors which determine the proportions of constituents where a number of possible solvents and non-solvents are concerned. As an example of the widely varying effect of the degree of miscibility of the non-solvent in the nitrocellulose solution as determining the proportions of constituents, and in this example the predominating factor, the fact that petroleum distillate is much more miscible with ethyl acetate-nitrocellulose solution than with acetone-nitrocellulose solution permits a greater quantity of petroleum distillate (42 to 45%, as compared to 18 to 22%, for additions of 10% nitrocellulose of 12 seconds' viscosity) to be used in the case of the ethyl acetate solution. On one hand, whereas a binary mixture of 11% acetone, balance petroleum distillate, may be employed to produce the modified pyroxylin surface according to the invention, it is necessary when 10% nitrocellulose of 12 seconds' viscosity is added to that binary mixture to increase the acetone content thereof to approximately 78 to 82% because of the poor miscibility of petroleum distillate in acetone-nitrocellulose solution. On the other hand, whereas a binary mixture of 25% ethyl acetate, balance petroleum distillate, may be employed, it is necessary when 10% nitrocellulose of 12 seconds' viscosity is added to that binary mixture to increase the ethyl acetate content thereof to only 55 to 58% on account of the greater miscibility of petroleum distillate in ethyl acetate-nitrocellulose solution. As an example of the widely varying effect of the degree of solubility of the nitrocellulose in the solvent as determining the proportions of constituents, and in this example the predominating factor, it will be noted that when acetone-butyl alcohol-nitrocellulose solutions are compared with the ethyl acetate-butyl alcohol-nitrocellulose solutions, the fact acetone is a slightly better solvent for nitrocellulose than is ethyl acetate and the miscibility of butyl alcohol is about the same in acetone-nitrocellulose solutions as in ethyl acetate-nitrocellulose solutions, slightly more nitrocellulose (25%, as compared to 22%, for nitrocellulose of 12 seconds' viscosity) can be added to the acetone-butyl alcohol mixture than to the ethyl acetate-butyl alcohol mixture.

The maximum amounts of nitrocellulose above mentioned may be employed in the mixtures for treating the normal base lacquer, but ordinarily about 10% thereof of 12 seconds' viscosity (or equivalent amounts of other viscosities in respect to the resulting heaviness of the mixture) added to the mixture of solvent and non-solvent will give satisfactory results. Although entirely possible to do so, there nevertheless would not be much point in adding less than 4 or 5% nitrocellulose of 12 seconds' viscosity or its equivalent, as with less amounts there would exist what in effect would be more or less a mere mixture of solvent and non-solvent.

In all the above examples the percentages specified are by weight. Where viscosity is referred to it is measured by the time in which it takes a steel ball ¼ inch in diameter to drop 10 inches through a tube 1 inch inside diameter filled with a solution, at 28° C., of 16 ounces nitrocellulose in one gallon ethyl acetate. When nitrocellulose has a viscosity of "12 seconds", for example, it takes the ball 12 seconds to drop, and, if its viscosity were greater, it would take the ball longer to drop. Where percentages of nitrocellulose are specified the mixture of solvent and non-solvent constitutes the balance, and where percentages of solvent or non-solvent are specified the non-solvent or solvent, respectively, constitutes the balance.

It will be understood from the above considerations that although any nitrocellulose solvent may be employed in the practice of the invention with any nitrocellulose non-solvent that is miscible therewith and does not evaporate too slowly relative to the non-solvent to make the particular combination impractical, and that mixtures containing nitrocellulose and solvents and non-solvents therefor may be employed when the non-solvent is miscible with the nitrocellulose-solvent mixture and may be used in such amounts that a substantial part thereof will remain in the nitrocellulose upon all the solvent evaporating, so many factors govern the proportions and percentage ranges of particular kinds of nitrocellulose and particular solvents and non-solvents that may be employed in these combinations that those proportions and percentages are not susceptible of general definition by arithmetical values. However, by observing the precautions herein set forth, it is a simple matter to determine the proportions that in any particular instance of ingredients will give the desired results. For example, with a binary mixture of solvent and non-solvent, or a mixture of nitrocellulose solution and non-solvent, a large amount of non-solvent may be employed so as to cause a blushed surface on the treated normal base lacquer. Then the amount of non-solvent may be gradually decreased until an amount thereof which will not cause the blush is determined, and that amount will be the maximum value of non-solvent that may be employed in that particular instance of constituents. Further decrease in the amount of non-solvent until the treated normal base lacquer is not rendered adherent to inks and water sensitive adhesives in the respects mentioned will give the minimum value of the non-solvent that may be employed in that instance.

It will be understood that within the scope of the appended claim wide deviations may be made from the forms of the invention herein described without departing from the sipirit thereof.

I claim:

The method of forming a pyroxylin coating which is waterproof and adherent to ink and water sensitive adhesives which comprises applying to the surface of a base coating of dry impervious waterproof pyroxylin a liquid film containing volatile nitrocellulose non-solvent dissolved in a solution of volatile solvent and nitrocellulose; and drying the coating after the film is applied to remove said solvent and non-solvent; the amount of solvent and non-solvent in said liquid film being insufficient to make the resulting dried coating non-waterproof, and the proportion of non-solvent in said liquid film being small enough relative to the proportion of solvent to cause the resulting dried coating to be unblushed, but being large enough to cause the resulting dried coating to be superficially minutely porous as indicated by the surface of that coating being adherent to water sensitive adhesives and pyroxylin non-soluble ink when said adhesives and ink are dried after application thereto without balling of the ink when wet.

ROWLAND B. MITCHELL.